(12) United States Patent
Tones et al.

(10) Patent No.: US 10,753,478 B2
(45) Date of Patent: Aug. 25, 2020

(54) BEARING ISOLATOR FOR EXTREME CONDITIONS

(71) Applicant: Garlock Sealing Technologies, LLC, Palmyra, NY (US)

(72) Inventors: Christopher Tones, Palmyra, NY (US); Christopher Fink, Palmyra, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 287 days.

(21) Appl. No.: 15/806,085

(22) Filed: Nov. 7, 2017

(65) Prior Publication Data

US 2018/0128380 A1 May 10, 2018

Related U.S. Application Data

(60) Provisional application No. 62/418,516, filed on Nov. 7, 2016.

(51) Int. Cl.
*F16J 15/447* (2006.01)
*F16C 33/80* (2006.01)
*F16J 15/34* (2006.01)

(52) U.S. Cl.
CPC .......... *F16J 15/4478* (2013.01); *F16C 33/80* (2013.01); *F16J 15/3456* (2013.01)

(58) Field of Classification Search
CPC .......................................... F16J 15/447–4478
See application file for complete search history.

(56) References Cited

U.S. PATENT DOCUMENTS

| 2,014,859 | A | 9/1935 | Mitchell, Jr. |
| 3,192,942 | A | 7/1965 | Manor et al. |
| 3,357,708 | A | 12/1967 | Parr |
| 3,465,425 | A | 9/1969 | Leidenfrost |
| 3,602,559 | A | 8/1971 | Hirschler |
| 3,663,023 | A | 5/1972 | Leidenfrost |

(Continued)

FOREIGN PATENT DOCUMENTS

| DE | 29715911 U | 2/1999 |
| EP | 0027539 A1 | 4/1981 |

(Continued)

OTHER PUBLICATIONS

International Search Report dated Feb. 11, 2004 corresponding to PCT/US03/30625.

*Primary Examiner* — Vishal A Patel
(74) *Attorney, Agent, or Firm* — Perkins Coie LLP

(57) ABSTRACT

A bearing isolator having a simple design and made from low-cost materials but which performs comparably to other higher-cost bearing isolators is described. The bearing isolator generally includes a rotor having a snap fit feature protruding from a radially-oriented flange and a stator having a snap fit feature recess for receiving the snap fit feature to thereby join together the stator and rotor without need for, e.g., a separate unitizing element. Furthermore, the rotor and/or stator can be made from lost cost material, such as a nylon/moly material. In some embodiments, the stator further includes a lip seal biased against the radially-oriented flange of the rotor, which, when combined with the labyrinth passage formed at least in part by the snap fit feature and snap fit feature recess, helps to prevent egress and ingress of lubricant and/or contaminates.

11 Claims, 4 Drawing Sheets

(56) References Cited

U.S. PATENT DOCUMENTS

| | | | |
|---|---|---|---|
| 3,664,675 A * | 5/1972 | Malmstrom | F16J 15/3244 277/400 |
| 3,893,674 A | 7/1975 | Paradine | |
| 3,923,125 A | 12/1975 | Rosenthal | |
| 4,053,163 A | 10/1977 | Vegella | |
| 4,070,150 A | 1/1978 | Katz et al. | |
| 4,153,258 A | 5/1979 | Huber et al. | |
| 4,166,606 A | 9/1979 | Kawolics et al. | |
| 4,290,610 A | 9/1981 | Lizogub et al. | |
| 4,451,046 A | 5/1984 | Bliven | |
| 4,466,620 A | 8/1984 | Orlowski | |
| 4,484,754 A | 11/1984 | Ballard | |
| 4,541,744 A | 9/1985 | Lederman | |
| 4,572,517 A | 2/1986 | Rockwood et al. | |
| 4,596,394 A * | 6/1986 | Schmitt | F16J 15/3256 277/353 |
| 4,679,801 A | 7/1987 | Poloni | |
| 4,706,968 A | 11/1987 | Orlowski | |
| 4,743,034 A | 5/1988 | Kakabaker et al. | |
| 4,832,350 A | 5/1989 | Orlowski | |
| 4,852,890 A | 8/1989 | Borowski | |
| 4,863,177 A | 9/1989 | Rockwood et al. | |
| 4,890,941 A * | 1/1990 | Calafell, II | F16J 15/4474 277/347 |
| 4,989,883 A | 2/1991 | Orlowski | |
| 5,024,451 A | 6/1991 | Borowski | |
| 5,028,054 A | 7/1991 | Peach | |
| 5,069,461 A | 12/1991 | Orlowski | |
| 5,074,567 A | 12/1991 | Orlowski | |
| 5,078,410 A | 1/1992 | Warman et al. | |
| 5,137,049 A | 8/1992 | Orlowski | |
| 5,158,304 A | 10/1992 | Orlowski | |
| 5,161,804 A | 11/1992 | Orlowski et al. | |
| 5,163,692 A | 11/1992 | Schofield et al. | |
| 5,174,583 A | 12/1992 | Orlowski et al. | |
| 5,221,095 A | 6/1993 | Orlowski | |
| 5,244,216 A | 9/1993 | Rhode | |
| 5,290,047 A * | 3/1994 | Duffee | F16C 33/80 277/419 |
| 5,303,935 A | 4/1994 | Saksun | |
| 5,316,317 A | 5/1994 | Fedorovich et al. | |
| 5,335,921 A | 8/1994 | Orlowski | |
| 5,378,000 A | 1/1995 | Orlowski | |
| 5,431,414 A | 7/1995 | Fedorovich et al. | |
| 5,470,157 A | 11/1995 | Dougherty et al. | |
| 5,480,161 A | 1/1996 | Borowski | |
| 5,498,006 A | 3/1996 | Orlowski | |
| 5,522,601 A | 6/1996 | Murphy | |
| 5,655,781 A | 8/1997 | Petrak | |
| 5,664,791 A | 9/1997 | Owen | |
| 5,683,091 A | 11/1997 | Isoe et al. | |
| 5,687,972 A | 11/1997 | Petrak | |
| 5,865,441 A | 2/1999 | Orlowski | |
| 5,887,875 A | 3/1999 | Salciccioli et al. | |
| 5,904,356 A | 5/1999 | Mundy | |
| 5,908,195 A | 6/1999 | Sharrer | |
| 5,951,020 A | 9/1999 | Orlowski | |
| 5,951,033 A | 9/1999 | Winter et al. | |
| 5,961,124 A | 10/1999 | Muller | |
| 5,967,524 A * | 10/1999 | Fedorovich | F16J 15/164 277/351 |
| 6,003,871 A | 12/1999 | Poll | |
| 6,015,153 A | 1/2000 | Sharrer | |
| 6,062,568 A | 5/2000 | Orlowski et al. | |
| 6,142,479 A | 11/2000 | Fedorovich | |
| 6,149,158 A * | 11/2000 | Tripathy | F16J 15/3228 277/307 |
| 6,182,972 B1 | 2/2001 | Orlowski | |
| 6,206,182 B1 * | 3/2001 | Wilson | B65G 39/09 198/501 |
| 6,213,476 B1 | 4/2001 | Chandler et al. | |
| 6,234,489 B1 | 5/2001 | Orlowski et al. | |
| 6,257,587 B1 | 7/2001 | Toth et al. | |
| 6,311,984 B1 | 11/2001 | Orlowski | |
| 6,367,807 B1 * | 4/2002 | Rockwood | F16J 15/4478 277/412 |
| 6,390,477 B1 | 5/2002 | Drago et al. | |
| 6,419,233 B2 | 7/2002 | Orlowski | |
| 6,471,211 B1 | 10/2002 | Garnett et al. | |
| 6,471,215 B1 | 10/2002 | Drago et al. | |
| 6,485,022 B1 * | 11/2002 | Fedorovich | F16J 15/4474 277/303 |
| 7,052,014 B1 * | 5/2006 | Orlowski | F16J 15/4478 277/303 |
| 7,390,580 B1 | 6/2008 | Dupont | |
| 8,047,548 B2 * | 11/2011 | Roddis | F16C 23/086 277/348 |
| 9,587,743 B2 * | 3/2017 | Jaskot | F16J 15/4476 |
| 9,701,827 B2 | 7/2017 | DuPont | |
| 2001/0002742 A1 | 6/2001 | Orlowski | |
| 2002/0167131 A1 | 11/2002 | Orlowski et al. | |
| 2003/0141668 A1 * | 7/2003 | Tones | F16C 33/80 277/413 |
| 2003/0235354 A1 | 12/2003 | Orlowski et al. | |
| 2004/0070150 A1 | 4/2004 | Chitren et al. | |
| 2006/0005950 A1 | 1/2006 | Wang et al. | |
| 2011/0109047 A1 * | 5/2011 | Tones | F16J 15/3244 277/412 |
| 2011/0204734 A1 * | 8/2011 | Orlowski | F16J 15/4478 310/85 |
| 2013/0228977 A1 * | 9/2013 | Thomas, Jr. | F16J 15/447 277/413 |
| 2015/0211639 A1 * | 7/2015 | Grimanis | F16J 15/447 277/303 |
| 2016/0208857 A1 * | 7/2016 | Rea | F16C 33/80 |
| 2016/0369895 A1 * | 12/2016 | Hoehle | F16J 15/4478 |

FOREIGN PATENT DOCUMENTS

| | | |
|---|---|---|
| EP | 1962001 A1 | 8/2008 |
| GB | 1026714 | 4/1966 |
| GB | 2219475 A | 12/1989 |
| JP | 11-108202 | 4/1999 |
| WO | 9553376 A1 | 11/1995 |
| WO | 2006005950 A2 | 1/2006 |

* cited by examiner

BEARING ISOLATOR FOR EXTREME CONDITIONS

CROSS-REFERENCE TO RELATED APPLICATIONS

This application claim priority to U.S. Provisional Patent Application No. 62/418,516, filed Nov. 7, 2016, the entirety of which is hereby incorporated by reference as if set out in full.

BACKGROUND

Labyrinth sealing devices are commonly used to provide a dynamic seal between a rotating shaft and a bearing housing. The sealing device excludes contaminates from the bearing housing while also preventing loss of bearing lubricants. In some applications, the lubrication level of the housing is above the lowest point of the seal. Commonly, the lubrication will eventually work through the seal and leak, where a non-contact seal is used. A contact-type seal is desirable in such applications.

Labyrinth sealing devices and other bearing isolators typically are made from high performance materials and possess complicated geometries to assist in exclusion of external contamination. As a result, labyrinth sealing devices and other bearing isolators can increase manufacturing costs, machining time, and assembly times. Thus, a need exists for a low cost bearing isolator that still provides high performance.

SUMMARY

This summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

A bearing isolator is disclosed herein that, in some embodiments, is used between a rotating shaft and a bearing housing. In such embodiments, the design includes an internal stator that engages the housing and a rotor that engages the shaft. A labyrinth pathway may be defined between the rotor and stator to prevent the migration of lubricants and/or contaminates in either direction.

In some embodiments, the material of the rotor and/or stator is a relatively low-cost material, such as nylon/moly material. In some embodiments, the bearing isolator is designed so as to not require a unitizing element. In some embodiments, the bearing isolator includes a snapping feature to connect the rotor with the stator. Each of these features, whether used individually or in any combination, help to reduce the cost of the bearing isolator through reductions in material, manufacturing, and/or assembly costs.

In some embodiments, the rotor includes a protruding snap fit feature, while the stator includes a snap fit feature recess configured to receive the snap fit feature and thereby align the rotor and stator in the desired manner while also ensuring the rotor and stator stay joined in an axial direction.

In some embodiments, the stator includes a lip seal extending from the stator in a radially outward direction and which is biased in the axially outer direction. When the stator and rotor are properly aligned, the lip seal presses against a radially-oriented flange of the rotor to thereby prevent the ingress or egress of contaminates, lubricant, etc.

These and other aspects of the bearing isolator described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in this Summary.

BRIEF DESCRIPTION OF THE DRAWINGS

Non-limiting and non-exhaustive embodiments of the disclosed bearing isolator, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1A:
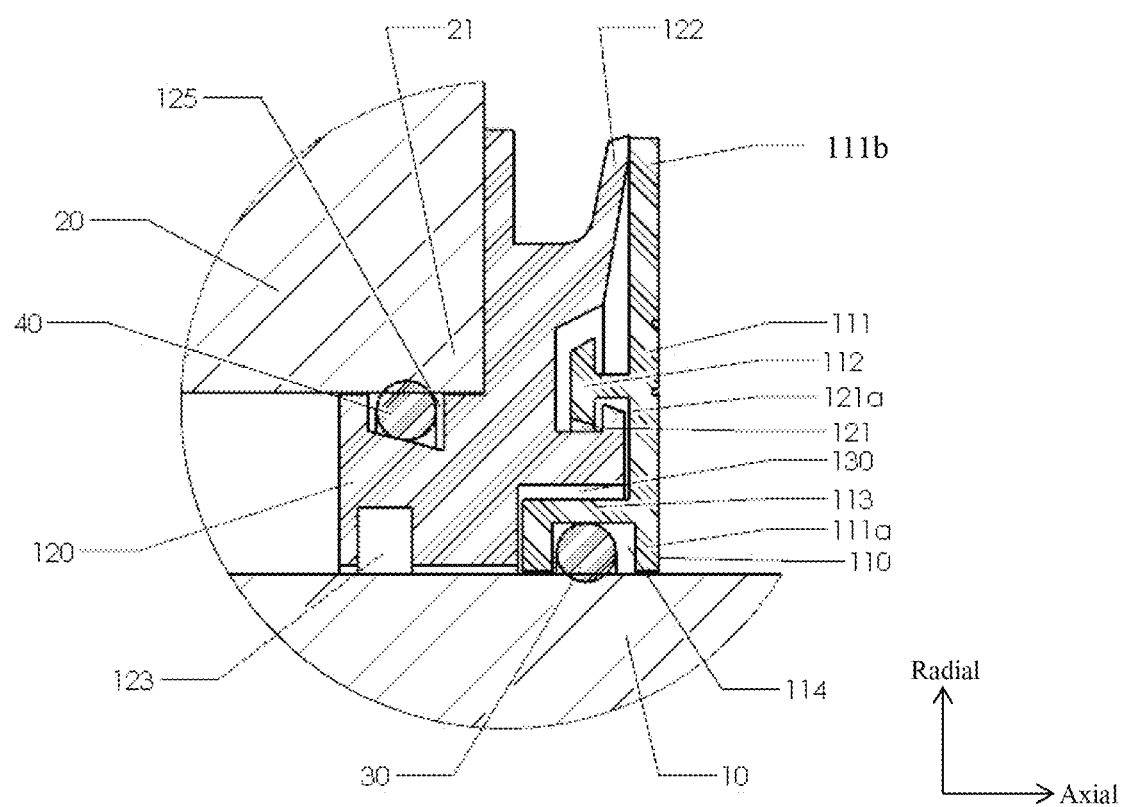
FIG. 1A is a cross-sectional view of a bearing isolator according to various embodiments described herein.

An embodiment of a bearing isolator as described herein is illustrated in FIG. 1A. The bearing isolator 100 generally includes a rotor 110 and a stator 120 that mate together to form a dynamic seal between a rotating shaft 10 and a bearing housing 20. As a result, the bearing isolator 100 will serve to prevent the leakage of lubricant from the bearing housing 20 and the entry of contaminates into the housing 20. In some embodiments, the rotor 110 is placed in sealing engagement with the shaft 10 by an O-ring 30. While FIG. 1A illustrates one O-ring 30, additional O-rings may be provided. In some embodiments, the stator 120 is placed in sealing engagement with the bearing housing 20 by an O-ring 40. While FIG. 1A illustrates one O-ring 40, additional O-rings may be provided.

For sake of describing the bearing isolator 100 described herein and illustrated in FIG. 1A, the axial direction corresponds to the horizontal direction in FIG. 1A and the radial direction corresponds to the vertical direction in FIG. 1A. Furthermore, the radial inner side of the bearing isolator 100 is considered to be proximate the shaft 10 (i.e., towards the bottom of FIG. 1A), the radial outer side of the bearing isolator is considered to be the side of the bearing isolator farthest from the shaft 10 (i.e., towards the top of FIG. 1A), the axial inner side is considered to be proximate the housing 20 (i.e., towards the left hand side of FIG. 1A) and the axial outer side is considered to be the side of the bearing isolator farthest away from the housing 20 (i.e., towards the right hand side of FIG. 1A). To assist in communicating this orientation, the axial and radial orientations are designated in FIG. 1A.

In some embodiments, the rotor 110, the stator 120, or both are made from a relatively low-cost material. In some embodiments, the low cost material is a nylon, filled nylon, or filled PTFE material. Other polymer materials, including other filled polymer materials may also be used. When a filled material is used, such as filled nylon or filled PTFE, various fillers can be used in conjunction with the polymer material. Exemplary various fillers include, but are not limited to, molybdenum, graphite, bentonite, talc, barium sulfite, and glass. Other lubricous fillers can also be used. Exemplary materials suitable for use as the low-cost material of the rotor 110 and/or stator 120 include, but are not limited to, glass-filled nylon or molybdenum-filled nylon (sometimes referred to as nylon/moly material). In other embodiments, the rotor 110 and/or stator 120 are made from a combination of PTFE and stainless steel.

The rotor 110 may generally include a radially-oriented flange 111 having a radially inner end 111a proximate the shaft 10 and a radially outer end 111b opposite the radially inner end 111a. A snap fit feature 112 is provided intermediate the outer end 111b and the inner end 111a and protrudes in an axial direction towards the stator 120. While the snap fit feature 112 protrudes in an axial direction towards the stator 120, the snap fit feature may also generally include a transverse portion (i.e., oriented in a radial direction) at its terminal end. For example, the snap fit feature 112 can have a general "T"-shape, though other shapes can also be used. As described in greater detail below, the snap fit feature 112 is shaped so as to be received within a snap fit feature recess formed in the stator 120 to thereby create an engagement between the rotor 110 and stator 120.

In some embodiments, the rotor 110 further includes an axially-oriented flange 113 that protrudes from the radially-oriented flange 111 in a direction towards the stator. The axially-oriented flange 113 may be located proximate the radially inner end 111a of the radially-oriented flange 111. In some embodiments, the axially-oriented flange 113 includes a recess 114 for accommodating the O-ring 30. In this regard, the recess 114 has a width in an axial direction, a depth in the radial direction, and opens to the shaft 10. When mated with the stator 120, the axially-oriented flange 113 of the rotor 110 overlaps in a radial direction with a portion of the stator 120 (i.e., extends under a portion of stator 120).

The stator 120 component of the bearing isolator 100 generally includes an axially outer side that faces the rotor 110. A snap fit feature recess 121 is formed in this side of the stator 120 such that when the rotor 110 and stator 120 are aligned and mated, the snap fit feature 112 resides within the recess 121. In some embodiments, the recess 121 is shaped to partially or substantially mirror the profile of the snap fit feature 112. In other words, if the snap fit feature 112 has a "T"-shape as discussed above, the recess 121 may also have a "T"-shape to thereby receive the snap fit feature 112. In some embodiments, the recess 121 is defined at least in part by a segment 121a of the stator 120 that extends in a radial direction. When the snap fit feature 112 is disposed in the recess 121, the segment 121a overlaps in an axial direction with a portion of the snap fit feature 112 to thereby impede axial movement of the snap fit feature 112 out of the recess 121. In order to facilitate insertion of the snap-fit feature 112 into the recess 121, the segment 121a may include an angled surface that the snap-fit feature 112 can slide over before locking into place within the recess 121. The snap-fit feature 112 can have a similar angled surface that engages with the angle surface of the segment 121a to further facilitate the movement of the snap fit feature 112 into the recess 121.

The stator 120 may further include a lip seal 122 extending from the axial outer side of the stator 120. In some embodiment, the lip seal 122 projects from a radial outer end of the axial outer side of the stator 120. In some embodiments, the lip seal 122 is biased in an axially outer direction towards the rotor 110 such that the lip seal 122 presses against the radially-oriented flange 111 of the rotor, and more specifically, the radially outer end 111b of the radially-oriented flange 111. This point of contact between the radially oriented flange 111 and the lip seal 122 helps to prevent the ingress or egress of materials into or out of the bearing isolator 110.

As shown in FIG. 1A, a labyrinth pathway 130 is formed between the rotor 110 and stator 120 via the geometries described above, and specifically the snap fit feature 112 residing in the recess 121 and the axially oriented flange 113 that overlaps with the stator 120. This labyrinth pathway 130 further helps to ensure that materials cannot pass from an inboard to outboard side of the system (or vice versa).

The stator 120 may further include a drain recess 123 located proximate the axially inner side and radially inner side of the stator 120. The drain recess 123 can generally be a recess that extends in a radial direction and which opens to the radially inner side of the bearing isolator 110. This drain recess 123 helps to expel any material that gets past, e.g., the lip seal 122 and the labyrinth pathway 130.

As shown in FIG. 1A, the stator further includes a recess 125 at the radial outer side of the stator 120 and which accommodates the O-ring 40. This recess 125 extends in a radially inner direction and opens to the radial outer side of the bearing isolator 100.

In some embodiments, the O-rings 30, 40 provided in the isolator bearing 100 described herein may be loaded with metal particles or fibers. The metal particles or fibers are used as a means of detecting if the O-rings have worn down to a point where the seal has failed or may fail. Metal detectors and/or x-rays can be used downstream of the bearing isolator for inspecting fluid passing therethrough and whether metal particles or fibers are present therein. The presence of such metal particles or fibers is an indication that the O-rings have worn down and released loaded metal particles or fibers, thus serving as an indicator of seal failure of potential failure. Such indicators are especially useful in, for example, food processing and pharmaceutical applications of the bearing isolator 100 where high purity levels are required. U.S. Pat. Nos. 7,390,580 and 9,701,827, both of which are hereby incorporated in their entirety, described suitable metal particle-loaded O-rings for use in the bearing isolator described herein.

As also shown in FIG. 1A, the stator 120 may be configured on its radially outer side to engage or fit with the housing 20. For example, as shown in FIG. 1A, the housing includes a corner 21 and the stator 120 is shaped such that a "step" is provided to receive the corner 21 and thereby engage or fit with the housing 20. Such a feature helps to ensure proper alignment between the bearing isolator 100 and the housing 20.

In some embodiments, the bearing isolator is free of a unitizing element that is used in previously-known bearing isolators. Generally speaking, such a unitizing element is not required in the bearing isolator design described herein because the snap fit feature 112 and the recess 121 obviate the need for a separate element to hold together the rotor and stator in an axial direction.

Figure 1B:
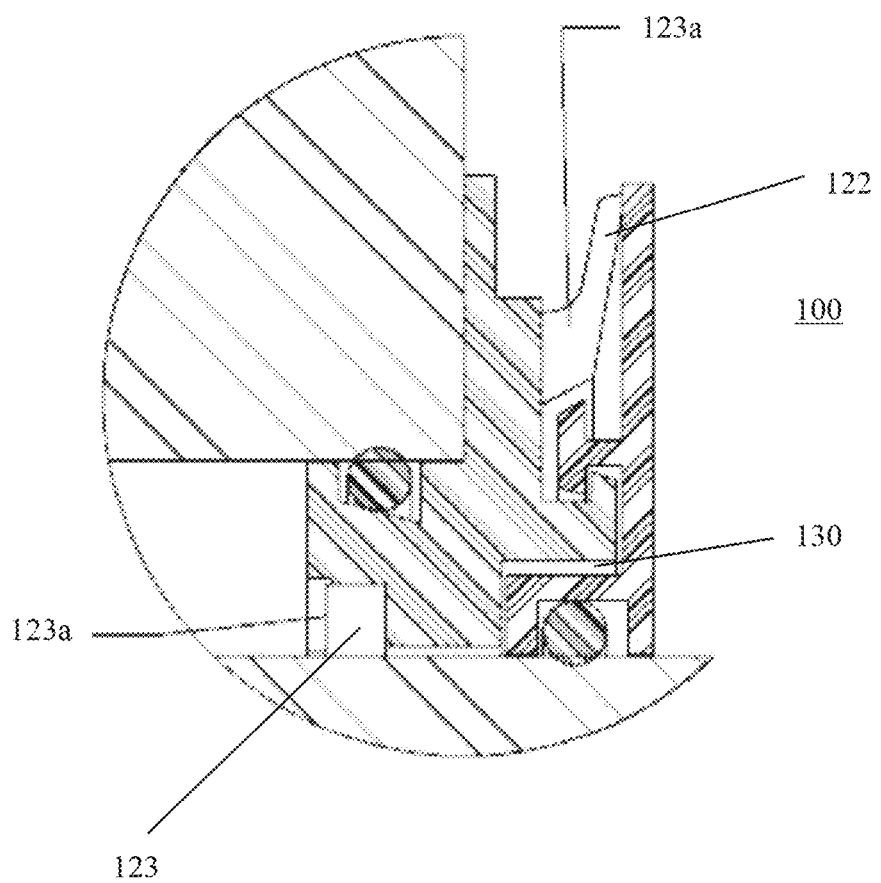
FIG. 1B is a cross-sectional view of a variation on the embodiment of the bearing isolator shown in FIG. 1A.

With reference to FIG. 1B, a bearing isolator identical to the bearing isolator 100 in FIG. 1A save for the inclusion of one or more drain ports 123a is shown. The drainports 123a are openings in the axial direction or radial direction that communicate with the drain recesses 123 or other parts of the bearing isolator 100 where it is desirable to provide a path for fluid to flow out of the bearing isolator 100. FIG. 1B shows two drainports 123a, though either of the drainports 123a could also be used alone. One drain port 123a is an opening formed in the stator 120 proximate the drain recess 123 in order to provide fluid communication between the drain recess 123 and the exterior of the bearing isolator 100 on the axial inner side of the bearing isolator 100. The other drain port 123a is an opening in the stator 120 proximate the lip seal 122 in order to provide fluid communication between the labyrinth pathway 130 and the exterior of the bearing isolator on the radial outer side of the bearing isolator. Either or both drainports 123a are provide so that any fluid that collects in either the drain recess 123 and/or the labyrinth seal 130 can be flushed out of the bearing isolator 100.

Figure 2A:
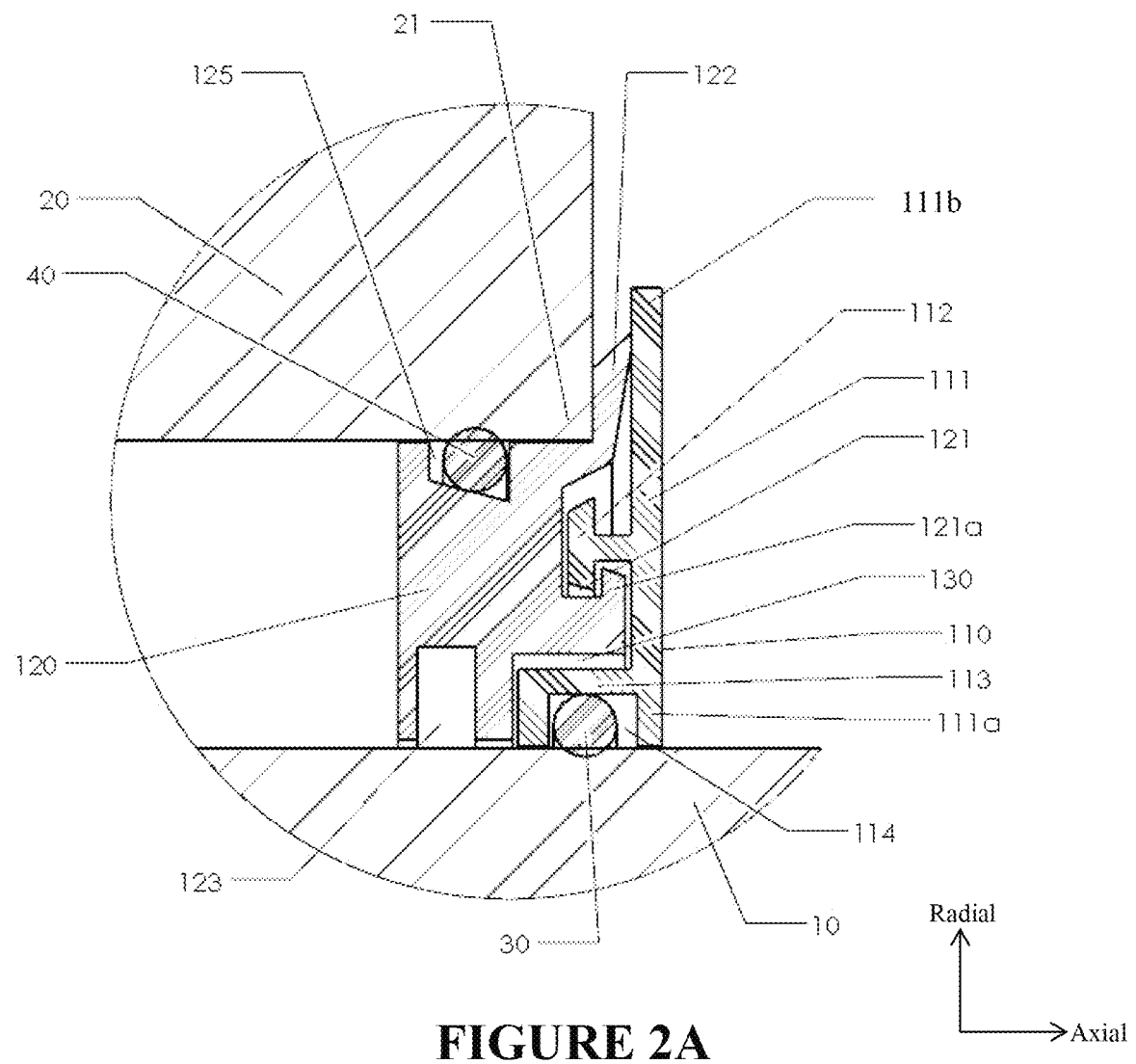
FIG. 2A is a cross-sectional view of a bearing isolator according to various embodiments described herein.

With reference to FIG. 2A, a bearing isolator identical to the bearing isolator 100 in FIG. 1A save for the configuration of the stator 120 proximate the lip seal 122 is shown. As shown in FIG. 1A, the stator 120 includes a radially extending arm extending from the radial outer side of the stator 120 that resides against the housing and a lip seal 122 separated from this radially extending arm by an annular groove formed in the radial outer surface of the stator 120. In the bearing isolator 100 shown in FIG. 2A, this configuration is changed by eliminating the radially extending arm and instead having the lip seal 122 rest against both the housing 20 (on its axial inner side) and the radially outer end 11b of radially-oriented flange 111.

Figure 2B:
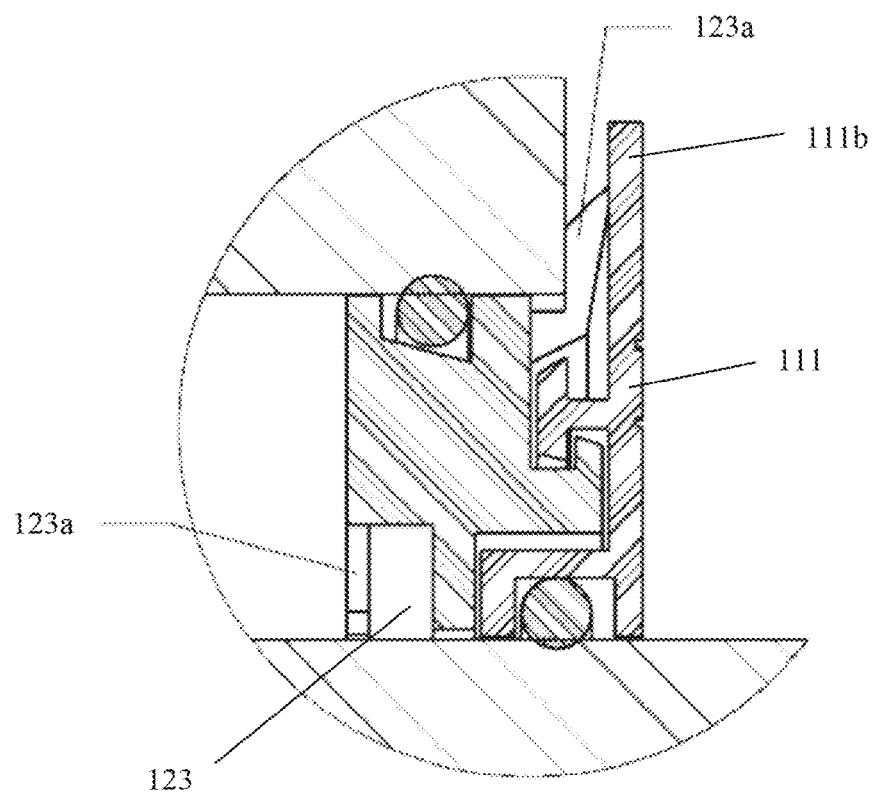
FIG. 2B is a cross-sectional view of a variation on the embodiment of the bearing isolator shown in FIG. 2A.

With reference to FIG. 2B, an alternate version of the bearing isolator 100 of FIG. 2A is shown, with the bearing isolator of FIG. 2b having similar drain ports 123 as discussed above with respect to FIG. 1A.

A primary benefit of the bearing isolator described herein is that the bearing isolator is less expensive than previously known bearing isolators due to the low cost materials used and the reduction in manufacturing and assembly costs. From the manufacturing perspective, the disclosed bearing isolator is less costly than other previously known bearing isolators due to the relatively simply design and the absence of components such unitizing elements. Reduced costs are also realized due to the parts being easily machined by commercially available equipment as compared to parts of other previously known bearing isolators with more complex geometries.

In addition to the bearing isolator described herein being less expensive to manufacture and assemble, the bearing isolator also performs comparably to other previously known and more expensive bearing isolators. For example, the bearing isolator described herein passes the IP69K test used to assess the sealing properties at extreme conditions. Under the IP69K test, high temperature water is sprayed at an aggressive rate and no leakage can pass through the seal in order to pass the test. The ability of the bearing isolator disclosed herein to pass the IP69K test serves as a good indicator that the disclosed bearing isolator is suitable for use under a wide range of conditions.

The bearing isolator described herein is also capable of use in flooded conditions. A flooded housing refers to a bearing cavity with an excess of lubricant, thus "flooded". Very few bearing isolators are capable of sealing under flood conditions, and thus this low cost bearing isolator is further advantageous from the perspective of its ability to be used under conditions that other bearing isolators cannot withstand.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:
1. A bearing isolator comprising:
a rotor comprising:
a radially oriented flange having a radially inner end and a radially outer end opposite the radially inner end;
an axially oriented flange extending in an axially inner direction from the radially inner end of the radially oriented flange; and
a snap fit feature having a shape located intermediate the radially inner end and radially outer end of the radially oriented flange and a first portion protruding in an axially inner direction and at least a second portion protruding from the first portion in a radially outward and inward direction; and
a stator comprising:
a lip seal extending in a radially outwardly and an axially outwardly direction to engage the radially outer end of the radially oriented flange;
a snap fit feature recess having a shape that mirrors the shape of the snap fit feature and is operatively sized configured to receive the snap fit feature of the rotor by itself,
wherein the axially oriented flange overlaps a portion of the stator to form a portion of a labyrinth pathway between the rotor and the stator;
wherein engagement of the snap fit feature into the snap fit feature recess prevents axial movement of the rotor away from the stator; and
wherein the rotor, the stator, or both are made from a material selected from a group of materials consisting of: nylon, molybdenum, or a combination of nylon and molybdenum material.

2. The bearing isolator of claim 1, wherein the material is glass-filled nylon.

3. The bearing isolator of claim 1, wherein the snap fit feature, the snap fit feature recess or both include an angled surface that facilitates movement of the snap fit feature into the snap fit recess.

4. The bearing isolator of claim 1, wherein each of the rotor and stator include at least one radially-oriented recess and an O-ring is disposed in each radially-oriented recess.

5. The bearing isolator of claim 4, at least one O-ring is loaded with metal particles or fibers.

6. The bearing isolator of claim 1, wherein the bearing isolator is free of a unitizing element separate from the rotor and stator.

7. The bearing isolator of claim 1, wherein the stator further comprises a drain recess located proximate the axial inner side of the stator and having an opening in the radial inner side of the stator.

8. The bearing isolator of claim 1, wherein the snap fit feature has a generally T-shape.

9. The bearing isolator of claim 1, wherein the lip seal is biased in an axially outer direction.

10. The bearing isolator of claim 1, wherein the axially oriented flange overlaps in a radial direction with a portion of the stator.

11. The bearing isolator of claim 1, wherein the stator, the rotor, or both are made from a combination of PTFE and stainless steel.

\* \* \* \* \*